United States Patent [19]

Takahashi et al.

[11] 4,161,457

[45] Jul. 17, 1979

[54] PROCESS FOR PREPARING A DIVALENT EUROPIUM ACTIVATED ALKALINE EARTH METAL ALUMINATE PHOSPHOR

[75] Inventors: Kōichi Takahashi, Odawara; Kinichiro Narita, Chigasaki; Akiyasu Kagami, Ninomiya; Takashi Hase, Fujisawa; Yoshiyuki Mimura, Chigasaki; Junro Koike, Machida; Ryuya Toyonaga, Ebina; Takehiro Kojima, Kawasaki, all of Japan

[73] Assignees: Dai Nippon Toryo Co., Ltd., Osaka; Nippon Hōsō Kyōkai, Tokyo, both of Japan

[21] Appl. No.: 777,692

[22] Filed: Mar. 15, 1977

[51] Int. Cl.$^2$ .............................................. C09K 11/46
[52] U.S. Cl. .............................................. 252/301.4 R
[58] Field of Search .............................. 252/301.4 R

[56] References Cited

U.S. PATENT DOCUMENTS

| 3,502,592 | 3/1970 | Amster | 252/301.4 |
| 3,577,350 | 5/1971 | Amster | 252/301.4 |

FOREIGN PATENT DOCUMENTS 49-77893  7/1974  Japan.

*Primary Examiner*—Jack Cooper

*Attorney, Agent, or Firm*—Gerald J. Ferguson, Jr.; Joseph J. Baker

[57] ABSTRACT

A process for preparing a divalent europium activated alkaline earth metal aluminate phosphor represented by the composition formula $$a\text{MgO} \cdot b\text{BaO} \cdot c\text{Al}_2\text{O}_3 \cdot d\text{EuO}$$

wherein a, b, c and d satisfy the conditions $$a+b+c+d=10, \text{ and}$$

$0 < a \leq 2.00$, $0.25 \leq b \leq 2.00$, $6.0 \leq c \leq 8.5$, $0.05 \leq d \leq 0.30$. A magnesium compound easily alterable to MgO at a high temperature, barium halide or mixture of barium compounds easily alterable to BaO at a high temperature containing barium halide at such a rate that the amount of barium contained in the barium halide is not less than 70% by weight of the total amount of barium in the mixture of the barium compounds, an aluminium compound easily alterable to $\text{Al}_2\text{O}_3$ at a high temperature and a europium compound easily alterable to $\text{Eu}_2\text{O}_3$ at a high temperature are mixed at a mixing weight ratio to satisfy the above composition formula. The mixture thus obtained is fired in air at a temperature of 1200° C. to 1600° C. and then further fired in a reducing atmosphere at a temperature of 1000° C. to 1600° C.

4 Claims, 2 Drawing Figures

PROCESS FOR PREPARING A DIVALENT EUROPIUM ACTIVATED ALKALINE EARTH METAL ALUMINATE PHOSPHOR

BACKGROUND OF THE INVENTION

Field of the Invention

This invention relates to a process for preparing a blue emitting phosphor, and more particularly to a process for preparing an alkaline earth metal aluminate phosphor activated with divalent europium.

This invention is particularly concerned with a process for preparing a phosphor sealed in an air-tight container of a gaseous discharge light emitting element which effects a high radiation efficiency and luminance. In the light emitting element, the discharge gap is in the range of 0.1 to 3.0 mm and the pressure of the gas sealed in the container is such that the product of the pressure and the discharge gap (hereinafter referred to as "pd product") is in the range of 30 to 300 Torr·mm.

Description of the Prior Art

It has known in the art to excite a phosphor with ultraviolet rays emitted by gaseous discharge to cause the phosphor to emit light. For instance, fluorescent lamps employ a phosphor which is excited by ultraviolet rays having a wavelength of 253.7 nm emitted by a discharge in a mercury vapor. When the gap between a pair of discharge electrodes within a small lamp is smaller than 3 mm, the pressure of the gas sealed in the lamp is required to be as high as several tens to several hundreds of Torrs in accordance with Paschen's law. In small lamps or image display panels in which the gap between the electrodes is smaller than 3 mm, therefore, the radiation of ultraviolet rays cannot be obtained effectively since the vapor pressure of mercury sealed within the lamp together with argon is as low as $10^{-3}$ Torr or less at 15° C. and $10^{-2}$ Torr or less even at 40° C. Therefore, in general, this kind of discharge lamp and other similar devices usually employ a rare gas, a hydrogen gas or a nitrogen gas or an appropriate mixture of these gases because with such gases a pressure of several tens to several hundreds of Torrs can easily be obtained at room temperature. The ultraviolet rays emitted by the gaseous discharge in the above mentioned gas or gas mixture have radiation spectra of high intensity mostly within the so-called vacuum ultraviolet region corresponding to the wavelength of shorter than 200 nm.

As a conventional phosphor which is used in image display panels employing gaseous discharge with a discharge gap of 0.1 to 3.0 mm and pd product of 30 to 300 Torr·mm and emitting blue light under excitation by ultraviolet rays, cathode rays or X-rays, there have been well known divalent europium activated alkaline earth metal aluminate phosphors ($BaO.6Al_2O_3:Eu^{2+}$, $MgO.BaO.8Al_2O_3:Eu^{2+}$, $2MgO.BaO.7Al_2O_3:Eu^{2+}$ etc.) as disclosed in Japanese Patent Public Disclosure No. 77893/1974. These phosphors, however, are known to emit blue light with high emission performance only under excitation by ultraviolet rays emitted by discharge in mercury vapor, that is ultraviolet rays having the wavelength of 253.7 nm (in case of low pressure mercury lamp) or 365 nm (in case of high pressure mercury lamp). However, the emission performance of the phosphor under excitation by vacuum ultraviolet rays having the wavelength shorter than 200 nm is hardly known.

SUMMARY OF THE INVENTION

In view of the above described defects and observations, the primary object of the present invention is to provide a process for preparing a blue emitting phosphor which emits blue light with high radiation efficiency under excitation by vacuum ultraviolet rays having the wavelength of shorter than 200 nm.

Another object of the present invention is to provide a process for preparing a blue emitting phosphor which emits blue light with high luminance under excitation by vacuum ultraviolet rays having the wavelength shorter than 200 nm.

Still another object of the present invention is to provide a process for preparing a blue emitting phosphor which emits blue light with high radiation efficiency and high luminance under excitation by cathode rays or X-rays.

The above objects are accomplished by preparing a divalent europium activated alkaline earth metal aluminate phosphor represented by the formula $$aMgO.bBaO.cAl_2O_3.dEuO$$

wherein a, b, c and d satisfy the following conditions;

$$a+b+c+d=10$$

$$0 < a \leq 2.00,\ 0.25 \leq b \leq 2.00,\ 6.0 \leq c \leq 8.5,$$
$$0.05 \leq d \leq 0.30.$$

The above phosphor is prepared by first mixing (a) a magnesium compound easily alterable to magnesium oxide (MgO) at a high temperature, (b) a barium halide or a mixture of barium compound easily alterable to barium oxide (BaO) at a high temperature containing barium halide at such a rate that the amount of barium contained in the barium halide is not less than 70% by weight of the total amount of barium, (c) an aluminium compound easily alterable to aluminium oxide ($Al_2O_3$) at a high temperature, and (d) a europium compound easily alterable to europium oxide ($Eu_2O_3$) at a high temperature with a mixing ratio which satisfies said formula of composition, then firing the mixture in air at a temperature of 1200° C. to 1600° C., and then further firing the mixture in a reducing atmosphere at a temperature of 1000° C. to 1600° C. The temperature of the primary firing and the secondary firing should preferably be 1300° C. to 1500° C. and 1200° C. to 1500° C., respectively.

The present invention will be described in further detail hereinbelow with reference to the accompanying drawings as follows.

DESCRIPTION OF THE PREFERRED EMBODIMENTS

Figure 1:
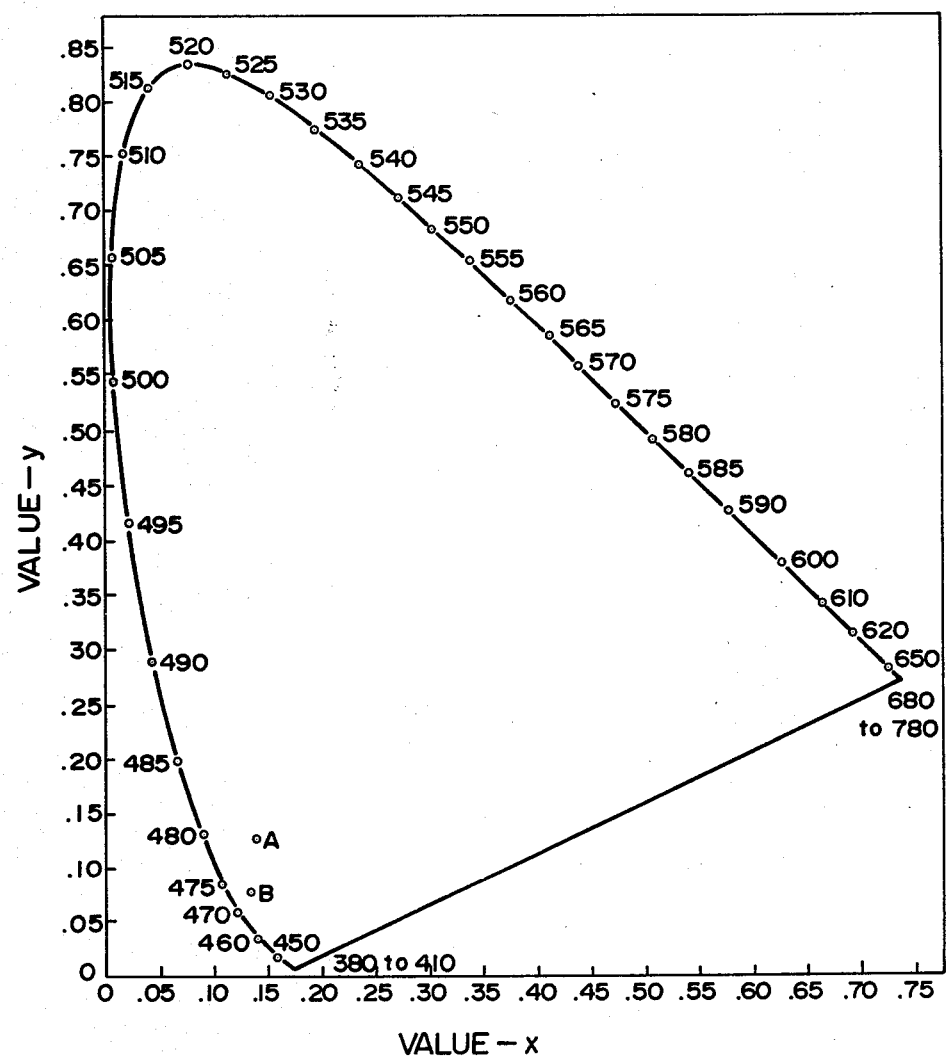
FIG. 1 is a CIE standard chromaticity diagram in which the color points of the light emitted by the phosphors prepared by the process in accordance with the present invention are indicated, wherein point A indicates the color point of the light emitted by the phosphor prepared by a process in which $BaCO_3$ is used as the raw material for BaO and the primary firing is conducted in air and the secondary firing is conducted in a reducing atmosphere, and point B indicates the color point of the light emitted by the phosphor prepared by a process in which $BaF_2$ is used as the raw material for BaO and the primary and secondary firings are conducted in the same atmospheres as those employed in said process for the point A.

Now the process for preparing a blue emitting phosphor in accordance with the present invention will be described in detail. The blue emitting phosphor prepared by the process of this invention is represented by the following composition formula;

$$aMgO \cdot bBaO \cdot cAl_2O_3 \cdot dEuO \quad (1)$$

wherein a, b, c and d are numbers which satisfy the following conditions;

$$a+b+c+d=10 \quad (2)$$

$$0 < a \leq 2.00, \ 0.25 \leq b \leq 2.00, \ 6.0 \leq c \leq 8.5,$$
$$0.05 \leq d \leq 0.30 \quad (3)$$

As the raw material for barium oxide (BaO) is used barium halide such as $BaF_2$, $BaCl_2$, $BaBr_2$ or $BaI_2$. As the raw material for magnesium oxide (MgO) is used magnesium compound (including MgO) easily alterable to magnesium oxide at a high temperature such as magnesium carbonate, nitrate, sulfate or halide. As the raw material for aluminium oxide ($Al_2O_3$) is used aluminium compound (including $Al_2O_3$) easily alterable to aluminium oxide at a high temperature such as aluminium hydroxide, nitrate, sulfate or halide. As the raw material for europium oxide (EuO) is used europium compound (including $Eu_2O_3$) easily alterable to europium oxide ($Eu_2O_3$) at a high temperature such as europium carbonate, nitrate, sulfate or halide.

The above raw materials are mixed together in a mixing weight ratio which satisfies said conditions (1), (2) and (3) in effect. The mixture thus obtained is fired in a heat resisting container such as a crucible. The firing is conducted twice, first in air and then in a reducing atmosphere. The secondary firing in a reducing atmosphere is conducted for instance in a nitrogen atmosphere containing 0.5 to 5% of hydrogen. The firing in a reducing atmosphere is also realized by firing said mixture in air with carbon powder. The firing temperature in the primary firing is desired to be 1200° C. to 1600° C., more preferably be 1300° C. to 1500° C. If the temperature is below 1200° C., the reaction is not sufficiently performed. If the temperature is above 1600° C., the mixture begins to be sintered. Therefore, at the temperatures below 1200° C. and above 1600° C. the phosphor having high radiation efficiency and high luminance cannot be obtained. The firing time may be changed depending upon the firing temperature and the amount of the mixture contained in the crucible, but is generally desired to be 30 minutes to five hours in said range of the firing temperature.

After the primary firing, the fired mixture is crushed, and thoroughly mixed and put into a heat resisting container again. Then, the secondary firing is conducted in a reducing atmosphere. The firing temperature in the secondary firing is desired to be 1000° C. to 1600° C., more preferably be 1200° C. to 1500° C. If the temperature is below 1000° C., the reaction is not sufficiently performed. If it is above 1600° C., the mixture begins to be sintered. Therefore, at the temperatures below 1000° C. and above 1600° C., the phosphor having high radiation efficiency and high luminance cannot be obtained. The firing time is desired to be 30 minutes to five hours. By the secondary firing, the trivalent europium is reduced to divalent europium. After the secondary firing, the fired mixture is washed, dried and sieved. Thus, a divalent europium activated alkaline earth metal aluminate phosphor is obtained. The phosphor thus obtained emits blue light with high radiation efficiency and high luminance under excitation by vacuum ultraviolet rays of the wavelength shorter than 200 nm. The composition formula of the phosphor thus obtained is as described hereinbefore indicated with (1).

In the foregoing process for preparing the phosphor, barium halide is used as the raw material for barium oxide (BaO). However, instead of the barium halide may be used a mixture of barium compound in which a part of the barium halide is replaced by barium compound (including BaO) easily alterable to barium oxide at a high temperature such as carbonate, nitrate or sulfate. In this case, the barium halide must be contained at a rate wherein the amount of barium contained in the barium halide is not less than 70% by weight of the total amount of barium in the mixture of barium compound. If it is less than 70% by weight, the radiation efficiency and the luminance of the phosphor are not made so high as those obtained when only barium halide is used.

It has been known in the art to use magnesium halide, aluminium halide and europium halide as the raw material for MgO, $Al_2O_3$ and EuO as disclosed, for instance, in Japanese Patent Public Disclosure No. 77893/1974. However, it has not been known to use barium halide as the raw material for BaO. In accordance with the tests conducted by the present inventors, it is impossible to obtain a phosphor having such high radiation efficiency and luminance without barium halide even if the above described halides of the other alkaline earth metals are used.

The luminance obtained by the phosphor prepared in accordance with the process of this invention under excitation by vacuum ultraviolet rays of the wavelength shorter than 200 nm (line spectrum of 147 nm emitted by discharge in a gas mixture of helium and xenon) is shown in Table I wherein the raw materials and the firing atmosphere are variously changed. The phosphor used to make Table I was MgO.0.8BaO.8Al$_2$O$_3$.0.2EuO. The firing temperature of the primary firing was 1500° C. and that of the secondary firing was 1300° C. The firing time of the primary and secondary firings was two hours, respectively. The reducing atmosphere shown in Table I was a nitrogen gas flow containing 2% of hydrogen. The luminance is represented as a relative value with respect to that obtained by the phosphor prepared by the process No. 9 in Table I. The process No. 9 belongs to the prior art.

Table I

| No. | Raw Materials MgO | BaO | Al$_2$O$_3$ | EuO | Firing Atoms. Prim. | Second. | Luminance |
|---|---|---|---|---|---|---|---|
| 1 | 4MgCO$_3$ . Mg(OH)$_2$ . 5H$_2$O | BaF$_2$ | Al(OH)$_3$ | Eu$_2$O$_3$ | Air | Reduc. | 238 |
| 2 | " | BaCl$_2$ | " | " | " | " | 227 |
| 3 | " | BaBr$_2$ | " | " | " | " | 211 |
| 4 | " | BaI$_2$ | " | " | " | " | 200 |
| 5 | " | BaCO$_3$ | " | " | " | " | 147 |
| 6 | " | " | AlF$_3$ | " | " | " | 145 |
| 7 | MgF$_2$ | " | Al(OH)$_3$ | " | " | " | 143 |
| 8 | 4MgCO$_3$ . Mg(OH)$_2$ . 5H$_2$O | " | " | EuF$_3$ | " | " | 150 |
| 9 | " | " | " | Eu$_2$O$_3$ | Reduc. | " | 100 |

The processes No. 1 to No. 4 are of the present invention and the processes No. 5 to No. 9 are beyond the scope of the present invention. The processes No. 5 to No. 9 do not employ barium halide as the raw material for BaO. As apparent from Table I, the luminance obtained by the phosphors prepared by the process of this invention as shown in Nos. 1 to 4 is markedly enhanced in comparison with the phosphors prepared by the process of prior art as shown in No. 9. The process No. 5 does not use barium halide. All the other conditions are the same as those of the process of this invention. The luminance of the phosphor prepared by the process No. 5 is higher than that of the prior art, but is lower than that of the present invention. Further, the process No. 5 has a defect in that the peak of the emission spectrum is shifted to the long wavelength and the half value width of the spectrum is enlarged, and accordingly the purity of the emitted light is lowered. Comparing the process No. 5 with the processes No. 1 to No. 4, it is proved that the barium halide effects to enhance the luminance of the phosphor and prevent the lowering of purity of the emitted light.

FIG. 1 shows the chromaticity coordinates of the color of the light emitted by the phosphors obtained by the process No. 1 and the process No. 5 in the CIE standard chromaticity diagram, wherein point A indicates the chromaticity of the light emitted by the phosphor obtained by the process No. 5 and point B indicates the chromaticity of the light emitted by the phosphor prepared by the process in accordance with the present invention. As shown in FIG. 1, the purity of the light emitted by the phosphor obtained in accordance with the present invention is superior to that obtained by the process No. 5.

In the processes No. 6 to No. 8, the raw materials for MgO, Al$_2$O$_3$ and EuO are all halides such as magnesium fluoride (MgF$_2$:No.7), aluminium halide (AlF$_3$:No.6) and europium halide (EuF$_3$:No.8). However, the luminance obtained by the phosphors prepared by these processes is not so high as that of the phosphors prepared by the process of this invention.

In the processes No. 1 to No. 4, only barium halide is used as the raw material for barium oxide. However, as mentioned before, instead of the barium halide may be used a mixture of barium compounds in which a part of the barium halide is replaced by barium compound easily alterable to barium oxide at a high temperature provided that the amount of barium contained in the barium halide is not less than 70% by weight of the total amount of barium in the mixture of the barium compounds. In the phosphor thus prepared also, the radiation efficiency and luminance are as high as those effected where the raw material for the barium oxide is only composed of barium halide. However, as the rate of the content of barium based on the barium halide decreases, the luminance is lowered. When the rate is below 70%, the radiation efficiency is lowered and the purity of color is also degraded. Although the results shown in Table I were obtained with respect to divalent europium activated alkaline earth metal aluminate phosphor having the composition formula of MgO.0.8BaO.-8Al$_2$O$_3$.0.2EuO, similar results were obtained with the phosphors having a different composition formula prepared by the process in accordance with the present invention.

Figure 2:
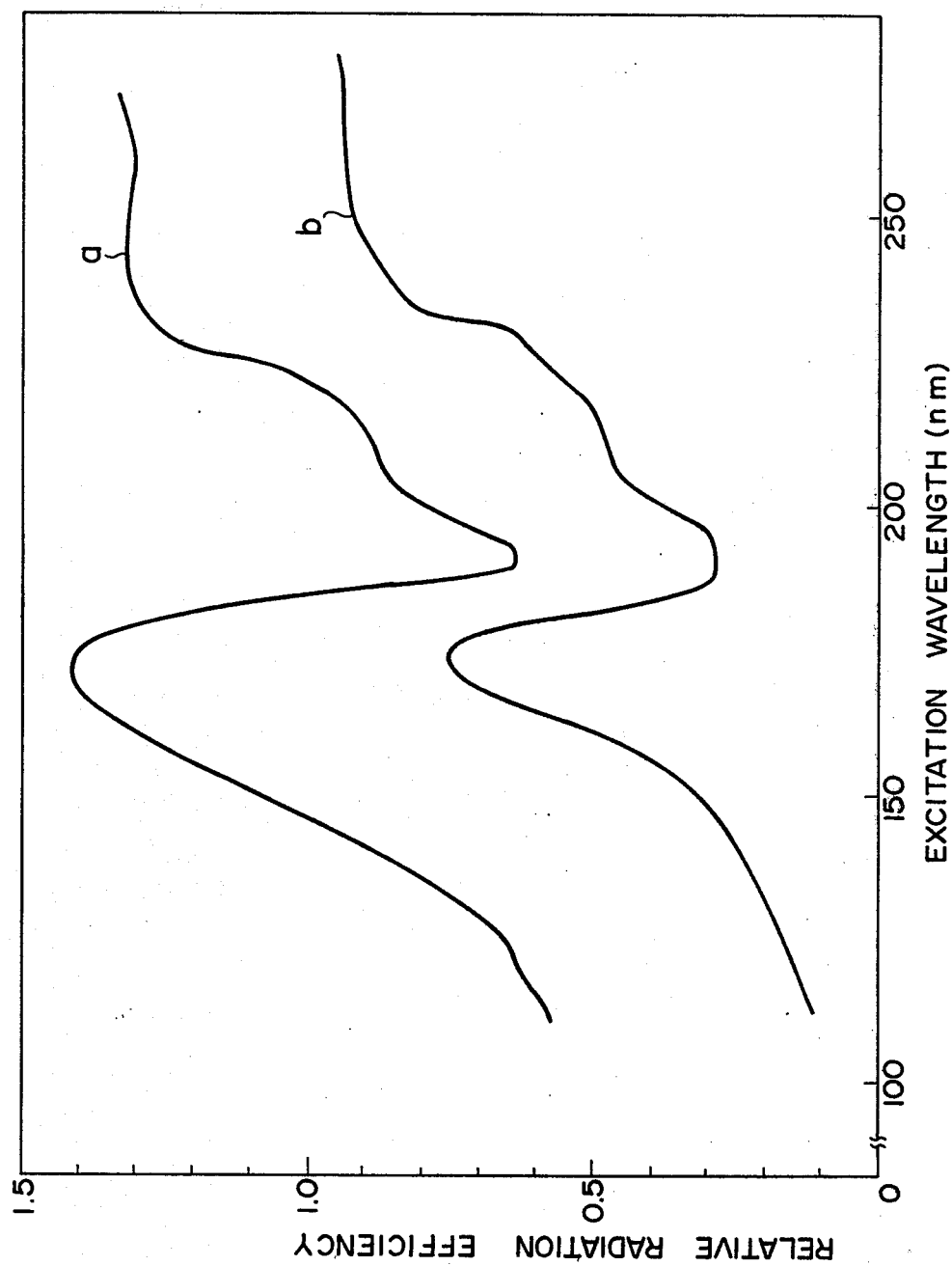
FIG. 2 shows the excitation spectra of the phosphors prepared by the process in accordance with the present invention and by a conventional process wherein curve-a shows a spectrum of the phosphor obtained by the process in accordance with the present invention in which barium halide is used as the raw material for BaO and the primary firing is conducted in air and the second firing is conducted in a reducing atmosphere, and curve-b shows a spectrum of the phosphor obtained by the process in accordance with the prior art in which a barium compound easily alterable to BaO at high temperature other than barium halide is used as the raw material for BaO and the primary and secondary firings are conducted in a reducing atmosphere.

The reason for the emission of light with high luminance by the phosphors prepared by the process of this invention in comparison with the phosphors prepared by the conventional processes under excitation by vacuum ultraviolet rays of the wavelength shorter than 200 nm is that the excitation efficiency of the phosphors prepared by this invention is much higher than that of the phosphors prepared by the prior art as shown in FIG. 2. As shown in FIG. 2, the curve-a which represents the excitation spectrum of the phosphor prepared by this invention indicates that the excitation efficiency thereof is much higher than that of the phosphors prepared by the conventional process represented by curve-b.

The phosphor prepared by the process in accordance with the present invention emits light with high luminance not only under excitation by ultraviolet rays of the wavelength shorter than 200 nm but also under excitation by normal ultraviolet rays, cathode rays and X-rays. It was confirmed that the luminance was as high as those shown in Table I when the phosphors prepared by the process of this invention were excited by ultraviolet rays of the wavelength of 253.7 nm or 365 nm, cathode rays or X-rays.

The process for preparing the phosphor in accordance with the present invention is markedly advantageous not only in that the practicability of divalent europium activated alkaline earth metal aluminate phosphor as a phosphor for a gaseous discharge light emitting element is enhanced, but also in that the practicability of the phoshor as a phosphor for a low pressure mercury lamp, a high pressure mercury lamp, a cathode ray tube and an X-ray image intensifier or the like is considerably enhanced.

Now the present invention will be described in detail with reference to several examples thereof.

EXAMPLE 1

| Magnesium carbonate | 4MgCO$_3$ . Mg(OH)$_2$ . 5H$_2$O | 3.16g |
|---|---|---|
| Barium flouride | BaF$_2$ | 6.58g |
| Aluminium hydroxide | Al(OH)$_3$ | 27.3 g |
| Europium oxide | Eu$_2$O$_3$ | 0.88g |

The above raw materials were thoroughly mixed and put into an alumina boat and fired for two hours in air at 1500° C. The fired mixture was crushed and mixed again and put into an alumina boat. Then, it was fired for one hour at 1200° C. in a quartz tube together with an alumina boat filled with 100 g of carbon powder. After firing, the fired mixture was washed, dried and sieved. Thus, a divalent europium activated alkaline earth metal aluminate phosphor represented by the composition formula $1.3MgO.1.5BaO.7Al_2O_3.0.2EuO$ was obtained. When the phosphor thus obtained was excited by a line spectrum of 147 nm emitted by gas discharge for instance in a gas mixture of helium and xenon, the luminance of blue light emitted therefrom was 242% as high as that of the phosphor of the same composition prepared by a conventional process in which $BaCO_3$ was used as the raw material for BaO and the primary and secondary firings were conducted in a reducing atmosphere. (The conventional process mentioned hereinbelow in Examples 2 to 8 is also of the same process as that mentioned here.) When the phosphor thus obtained was excited by ultraviolet rays of 253.7 nm or 365 nm, cathode rays or X-rays also, blue emission of high luminance was obtained as in the case where the phosphor was excited by vacuum ultraviolet rays of the wavelength shorter than 200 nm.

EXAMPLE 2

| Magnesium carbonate | $4MgCO_3 . Mg(OH)_2 . 5H_2O$ | 3.40g |
|---|---|---|
| Barium chloride | $BaCl_2 . 2H_2O$ | 3.05g |
| Aluminium hydroxide | $Al(OH)_3$ | 31.2 g |
| Europium oxide | $Eu_2O_3$ | 0.44g |

The above raw materials were thoroughly mixed and put into an alumina boat and fired for 2.5 hours in air at 1400° C. The fired mixture was crushed and mixed again and put into an alumina boat. Then, it was fired for two hours at 1250° C. in a nitrogen gas flow containing 2% of hydrogen. After firing, the fired mixture was washed, dried and sieved. Thus, a divalent europium activated alkaline earth metal aluminate phosphor represented by the composition formula $1.4MgO.0.5BaO.8Al_2O_3.0.1EuO$ was obtained. When the phosphor thus obtained was excited by a line spectrum of 147 nm emitted by gas discharge for instance in a gas mixture of helium and xenon, the luminance of blue light emitted therefrom was 220% as high as that of the phosphor of the same composition prepared by the same conventional process as used in Example 1. When the phosphor thus obtained was excited by ultraviolet rays of 253.7 nm or 365 nm, cathode rays or X-rays, blue emission of high luminance was also obtained as in the case where the phosphor was excited by vacuum ultraviolet rays of the wavelength shorter than 200 nm.

EXAMPLE 3

| Magnesium oxide | MgO | 1.15g |
|---|---|---|
| Barium bromide | $BaBr_2$ | 14.86g |
| Aluminium hydroxide | $Al(OH)_3$ | 24.38g |
| Europium oxide | $Eu_2O_3$ | 1.10g |

The above raw materials were thoroughly mixed and put into an alumina crucible and fired for four hours in air at 1300° C. The fired mixture was crushed and mixed again and put into an alumina crucible. Then, it was fired for three hours at 1150° C. in a nitrogen gas flow containing 2% of hydrogen. After firing, the fired mixture was washed, dried and sieved. Thus, a divalent europium activated alkaline earth metal aluminate phosphor represented by the composition formula $1.5MgO.2BaO.6.25Al_2O_3.0.25EuO$ was obtained. When the phosphor thus obtained was excited by a line spectrum of 147 nm emitted by gas discharge for instance in a gas mixture of helium and xenon, the luminance of blue light emitted therefrom was 205% as high as that of the phosphor of the same composition prepared by the same conventional process as used in Example 1. When the phosphor thus obtained was excited by ultraviolet rays of 253.7nm or 365nm, cathode rays or X-rays, blue emission of high luminance was also obtained as in the case where the phosphor was excited by vacuum ultraviolet rays of the wavelength shorter than 200 nm.

EXAMPLE 4

| Magnesium carbonate | $4MgCO_3 . Mg(OH)_2 . 5H_2O$ | 2.43g |
|---|---|---|
| Barium fluoride | $BaF_2$ | 6.58g |
| Aluminium oxide | $Al_2O_3$ | 18.94g |
| Europium oxide | $Eu_2O_3$ | 0.31g |

The above raw materials were thoroughly mixed and put into an alumina crucible and fired for two hours in air at 1500° C. The fired mixture was crushed and mixed again and put into an alumina crucible. Then, it was fired for 1.5 hours at 1400° C. in a quartz tube together with an alumina boat filled with 100 g of carbon powder. After firing, the fired mixture was washed, dried and sieved. Thus, a divalent europium activated alkaline earth metal aluminate phosphor represented by the composition formula $MgO.1.5BaO.7.43Al_2O_3.0.07EuO$ was obtained. When the phosphor thus obtained was excited by a line spectrum of 147 nm emitted by gas discharge for instance in a gas mixture of helium and xenon, the luminance of blue light emitted therefrom was 200% as high as that of the phosphor of the same composition prepared by the same conventional process as used in Example 1. When the phosphor thus obtained was excited by ultraviolet rays of 253.7 nm or 365nm, cathode rays or X-rays, blue emission of high luminance was also obtained as in the case where the phosphor was excited by vacuum ultraviolet rays of the wavelength shorter than 200 nm.

EXAMPLE 5

| Magnesium carbonate | $4MgCO_3 . Mg(OH)_2 . 5H_2O$ | 0.85g |
|---|---|---|
| Barium flouride | $BaF_2$ | 4.38g |
| Barium chloride | $BaCl_2 . 2H_2O$ | 3.05g |
| Aluminium hydroxide | $Al(OH)_3$ | 31.2 g |
| Europium oxide | $Eu_2O_3$ | 0.66g |

The above raw materials were thoroughly mixed and put into an alumina boat and fired for 2.5 hours in air at 1450° C. The fired mixture was crushed and mixed again and put into an alumina boat. Then, it was fired for two hours at 1300° C. in a nitrogen gas flow containing 2% of hydrogen. After firing, the fired mixture was washed, dried and sieved. Thus, a divalent europium activated alkaline earth metal aluminate phosphor represented by the composition formula $0.35MgO.1.5BaO.8Al_2O_3.0.15EuO$ was obtained. When the phosphor thus obtained was excited by a line spectrum of 147 nm emitted by gas discharge for instance in a gas mixture of helium and xenon, the luminance of blue light emitted therefrom was 230% as high as that of the phosphor of the same composition prepared by the same conventional process as used in Example 1. When the phosphor thus obtained was excited by ultraviolet rays of 253.7 nm or 365 nm, cathode rays or X-rays, blue emission of high luminance was also obtained as in the case where the phosphor was excited by vacuum ultraviolet rays of the wavelength shorter than 200 nm.

EXAMPLE 6

| Magnesium oxide | MgO | 1.81g |
|---|---|---|
| Barium iodide | BaI . 2H$_2$O | 3.20g |
| Aluminium oxide | Al$_2$O$_3$ | 19.37g |
| Europium oxide | Eu$_2$O$_3$ | 1.32g |

The above raw materials were thoroughly mixed and put into an alumina crucible and fired for three hours in air at 1350° C. The fired mixture was crushed and mixed again and put into an alumina crucible. Then, it was fired for 1.5 hours at 1400° C. in a quartz tube together with an alumina boat filled with 100 g of carbon powder. After firing, the fired mixture was washed, dried and sieved. Thus, a divalent europium activated alkaline earth metal aluminate phosphor represented by the composition formula 1.8MgO.0.3BaO.7.6Al$_2$O$_3$.0.3EuO was obtained. When the phosphor thus obtained was excited by a line spectrum of 147 nm emitted by gas discharge for instance in a gas mixture of helium and xenon, the luminance of blue light emitted therefrom was 195% as high as that of the phosphor of the same composition prepared by the same conventional process as used in Example 1. When the phosphor thus obtained was excited by ultraviolet rays of 253.7 nm or 365 nm, cathode rays or X-rays, blue emission of high luminance was also obtained as in the case where the phosphor was excited by vacuum ultraviolet rays of the wavelength shorter than 200 nm.

EXAMPLE 7

| Magnesium carbonate | 4MgCO$_3$ . Mg(OH)$_2$ . 5H$_2$O | 2.43g |
|---|---|---|
| Barium flouride | BaF$_2$ | 6.71g |
| Barium carbonate | BaCO$_3$ | 1.33g |
| Aluminium hydroxide | Al(OH)$_3$ | 27.3 g |
| Europium oxide | Eu$_2$O$_3$ | 0.88g |

The above raw materials were thoroughly mixed and put into an alumina boat and fired for two hours in air at 1500° C. The fired mixture was crushed and mixed again and put into an alumina boat. Then, it was fired for one hour at 1250° C. in a nitrogen gas flow containing 2% of hydrogen. After firing, the fired mixture was washed, dried and sieved. Thus, a divalent europium activated alkaline earth metal aluminate phosphor represented by the composition formula Mg0.1.8BaO.7Al$_2$O$_3$.0.2EuO was obtained. When the phosphor thus obtained was excited by a line spectrum of 147 nm emitted by gas discharge for instance in a gas mixture of helium and xenon, the luminance of blue light emitted therefrom was 230% as high as that of the phosphor of the same composition prepared by the same conventional process as used in Example 1. When the phosphor thus obtained was excited by ultraviolet rays of 253.7 nm or 365 nm, cathode rays or X-rays, blue emission of high luminance was also obtained as in the case where the phosphor was excited by vacuum ultraviolet rays of the wavelength shorter than 200 nm.

EXAMPLE 8

| Magnesium carbonate | 4MgCO$_3$ . Mg(OH)$_2$ . 5H$_2$O | 3.64g |
|---|---|---|
| Barium chloride | BaCl$_2$ . 2H$_2$O | 3.66g |
| Barium carbonate | BaCO$_3$ | 0.99g |
| Aluminium hydroxide | Al(OH)$_3$ | 29.25g |
| Europium oxide | Eu$_2$O$_3$ | 0.88g |

The above raw materials were thoroughly mixed and put into an alumina crucible and fired for three hours in air at 1350° C. The fired mixture was crushed and mixed again and put into an alumina crucible. Then, it was fired for two hours at 1200° C. in a nitrogen gas flow containing 2% of hydrogen. After firing, the fired mixture was washed, dried and sieved. Thus, a divalent europium activated alkaline earth metal aluminate phosphor represented by the composition formula 1.5MgO.0.8BaO.7.5Al$_2$O$_3$.0.2EuO was obtained. When the phosphor thus obtained was excited by a line spectrum of 147 nm emitted by gas discharge for instance in a gas mixture of helium and xenon, the luminance of blue light emitted therefrom was 225% as high as that of the phosphor of the same composition prepared by the same conventional process as used in Example 1. When the phosphor thus obtained was excited by ultraviolet rays of 253.7 nm or 365 nm, cathode rays or X-rays, blue emission of high luminance was also obtained as in the case where the phosphor was excited by vacuum ultraviolet rays of the wavelength shorter than 200 nm.

We claim:

1. A process for preparing a divalent europium activated alkaline earth metal aluminate phosphor comprising: mixing magnesium oxide or a magnesium compound convertible to magnesium oxide at the firing temperature used in said process, a barium halide or a mixture of a barium halide and barium oxide or a barium compound decomposable to barium oxide at said firing temperature containing barium halide at such a rate that the amount of barium contained in the barium halide is not less than 70% by weight of the total amount of barium in said mixture, an aluminum compound convertible to aluminum oxide at said firing temperature, and Eu$_2$O$_3$ or a europium compound convertible to Eu$_2$O$_3$ at said firing temperature at at mixing ratio which satisfies the composition formula $$aMgO.bBaO.cAl_2O_3dEuO$$

wherein, a, b, c and d are numbers satisfying the conditions $$a+b+c+d \doteq 10, \text{ and}$$

$0 < a \leq 2.00$, $0.25 \leq b \leq 2.00$, $6.0 \leq c \leq 8.5$, $0.05 \leq d \leq 0.30$; firing the mixture in air at a temperature of 1200° C. to 1600° C; and then firing the fired mixture in a reducing atmosphere at a temperature of 1000° C. to 1600° C.

2. A process for preparing a divalent europium activated alkaline earth metal aluminate phosphor as defined in claim 1 wherein said mixture is first fired at a temperature of 1300° C. to 1500° C.

3. A process for preparing a divalent europium activated alkaline earth metal aluminate phosphor as defined in claim 2 wherein the first fired mixture is fired at a temperature of 1200° C. to 1500° C.

4. A process for preparing a divalent europium activated alkaline earth metal aluminate phosphor as defined in claim 1 wherein the first fired mixture is fired at a temperature of 1200° C. to 1500° C.

* * * * *